US008942761B2

(12) United States Patent
Vance

(10) Patent No.: US 8,942,761 B2
(45) Date of Patent: Jan. 27, 2015

(54) TWO PORT ANTENNAS WITH SEPARATE ANTENNA BRANCHES INCLUDING RESPECTIVE FILTERS

(75) Inventor: Scott LaDell Vance, Staffanstorp (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 114 days.

(21) Appl. No.: 13/133,476

(22) PCT Filed: Jun. 18, 2010

(86) PCT No.: PCT/IB2010/001508
§ 371 (c)(1),
(2), (4) Date: Jun. 8, 2011

(87) PCT Pub. No.: WO2011/158057
PCT Pub. Date: Dec. 22, 2011

(65) Prior Publication Data
US 2013/0102357 A1    Apr. 25, 2013

(51) Int. Cl.
*H04M 1/00* (2006.01)
*H01Q 1/50* (2006.01)
(Continued)

(52) U.S. Cl.
CPC .............. *H01Q 1/50* (2013.01); *H01Q 1/243* (2013.01); *H01Q 5/0037* (2013.01); *H01Q 5/0048* (2013.01); *H01Q 9/0421* (2013.01); *H04M 1/0202* (2013.01)
USPC ........................................ 455/550.1; 343/857

(58) Field of Classification Search
CPC ... H01Q 1/243; H01Q 9/0442; H01Q 5/0051; H01Q 1/36; H01Q 13/10; H03F 1/56; H03F 2200/387; H03F 2200/423; H03F 3/245; H03F 3/601

USPC ........... 333/126, 206; 343/700 MS, 702, 715, 343/767, 770, 790, 841, 895; 455/289, 557, 455/575.7, 562.1, 121, 82, 269
See application file for complete search history.

(56) References Cited

U.S. PATENT DOCUMENTS 6,085,071 A     7/2000  Yamada et al.
2002/0126052 A1  9/2002  Boyle
(Continued)

FOREIGN PATENT DOCUMENTS

CN    1198612 A    11/1998
CN    1387382 A    12/2002
(Continued)

OTHER PUBLICATIONS

International Preliminary Report on Patentability Corresponding to International Application No. PCT/IB2010/001508; Date of Mailing: Jan. 3, 2013; 8 Pages.
(Continued)

*Primary Examiner* — Golam Sorowar
(74) *Attorney, Agent, or Firm* — Myers Bigel Sibley & Sajovec, P.A.

(57) ABSTRACT

A communication structure may include a mobile terminal ground plane including a ground point. A primary radiator is electrically coupled to the ground point. A first antenna branch includes a first filter circuit that is coupled between a first point on the primary radiator and a first antenna port and that corresponds to a first frequency band. A second antenna branch includes a second filter circuit that is coupled between a second point on the primary radiator and a second antenna port that corresponds to a second frequency band that is different from the first frequency band. In addition, a radio frequency (RF) transmitter and/or receiver may be provided with the ground plane and the primary radiator being electrically coupled to the RF transmitter and/or receiver.

18 Claims, 4 Drawing Sheets

(51) Int. Cl.
*H01Q 1/24* (2006.01)
*H01Q 5/00* (2006.01)
*H01Q 9/04* (2006.01)
*H04M 1/02* (2006.01)

(56) References Cited

U.S. PATENT DOCUMENTS

| | | | |
|---|---|---|---|
| 2002/0190905 A1* | 12/2002 | Flint et al. | 343/702 |
| 2003/0216150 A1 | 11/2003 | Ueda | |
| 2004/0070538 A1* | 4/2004 | Horie et al. | 343/700 MS |
| 2006/0097918 A1 | 5/2006 | Oshiyama et al. | |
| 2009/0149136 A1* | 6/2009 | Rofougaran | 455/77 |
| 2010/0238075 A1* | 9/2010 | Pourseyed | 343/702 |

FOREIGN PATENT DOCUMENTS

| | | |
|---|---|---|
| CN | 1457531 A | 11/2003 |
| CN | 1461166 A | 12/2003 |
| CN | 1493095 A | 4/2004 |
| CN | 1714471 A | 12/2005 |
| CN | 101453222 A | 6/2009 |
| EP | 0 865 095 A1 | 9/1998 |
| EP | 1 258 940 A1 | 11/2002 |
| EP | 1 363 360 A | 11/2003 |
| EP | 1 363 360 A1 | 11/2003 |
| EP | 2 182 577 A | 5/2010 |
| EP | 2 182 577 A1 | 5/2010 |
| EP | 2 234 207 A1 | 9/2010 |
| WO | WO 02/071535 | 9/2002 |

OTHER PUBLICATIONS

International Search Report for PCT/IB2010/001508, dated Mar. 1, 2011.
Written Opinion of the International Searching Authority for PCT/IB2010/001508, dated Mar. 1, 2011.
Chinese Office Action and Search Report Corresponding to Chinese Application No. 201080066808; Date of Issuance: Feb. 8, 2014; Foreign Text, 10 Pages, English Translation Thereof, 12 Pages.

* cited by examiner

TWO PORT ANTENNAS WITH SEPARATE ANTENNA BRANCHES INCLUDING RESPECTIVE FILTERS

RELATED APPLICATION

The present application is a 35 U.S.C. §371 national stage application of PCT International Application No. PCT/IB2010/001508, having an international filing date of Jun. 18, 2010, the disclosure of which is incorporated by reference in its entirety.

FIELD OF THE INVENTION

The present invention relates to the field of electronics, and more particularly to antennas for communications structures.

BACKGROUND

Sizes of wireless radiotelephone communications terminals (also referred to as mobile terminals) have been decreasing while the number of additional wireless features including different antenna performance criteria has been increasing. Correspondingly, there is increasing interest in providing small antennas that may operate in a variety of different frequency bands. For example, it may be desirable for a wireless radiotelephone communication terminal to operate within multiple frequency bands, for example, to allow use of more than one communications system/standard. For example, Global System for Mobile communication (GSM) is a digital mobile telephone system that may typically operate at a relatively low frequency band, such as between 824 MHz and 894 MHz and/or between 880 MHz and 960 MHz. Code Division Multiple Access is another digital mobile telephone system that may operate at frequency bands such as between 1710 MHz and 1755 MHz band and/or between 2110 MHz and 2170 MHz. Digital Communications System (DCS) is a digital mobile telephone system that may typically operate at relatively high frequency bands, such as between 1710 MHz and 1880 MHz. Personal Communication Services (PCS) is a digital mobile telephone system that may operate at frequency bands between 1850 MHz and 1990 MHz. In addition, global positioning systems (GPS) and/or Bluetooth systems may use frequencies of 1.575 and/or 2.4-2.48 GHz. Other frequency bands may be used in other jurisdictions. Accordingly, internal antennas that may operate at multiple frequency bands may be desirable.

SUMMARY

According to some embodiments of the present invention, a communication structure includes a mobile terminal ground plane including a ground point. A primary radiator is electrically coupled to the ground point. A first antenna branch includes a first filter circuit that is coupled between a first point on the primary radiator and a first antenna port and that corresponds to a first frequency band. A second antenna branch includes a second filter circuit that is coupled between a second point on the primary radiator and a second antenna port that corresponds to a second frequency band that is different from the first frequency band.

In some embodiments, the first point on the primary radiator is arranged between the second point on the primary radiator and the ground point and the first antenna port includes a global positioning system (GPS) port. Some embodiments provide that the second antenna port is a Blue-Tooth and/or wireless local area network (WLAN) port. Some embodiments provide that the first filter circuit includes a first bandpass filter that is configured to provide a low ohmic path to signals corresponding to frequencies at least of about 1.575 GHz and the second filter circuit includes a second bandpass filter that is configured to provide a low ohmic path to signals corresponding to frequencies at least of about 2.4 GHz.

Some embodiments provide that the second filter circuit is operable to filter out a signal that includes frequencies in the first frequency band and the first filter circuit is operable to filter out a signal that includes frequencies in the second frequency band. A difference between the first frequency band and the second frequency band provides frequency isolation between the first port and the second port.

In some embodiments, the first antenna branch is operable to resonate at the first frequency band, the second antenna branch is operable to resonate at the second frequency band, and the first frequency band is substantially adjacent the second frequency band to provide antenna performance over a combined bandwidth that substantially includes the first frequency band and the second frequency band. Some embodiments provide that the combined bandwidth includes a frequency band including a frequency range of about 700 Mhz to about 960 MHz. A filter may be provided that is operable to selectively activate the communication structure corresponding to one of the first frequency band and the second frequency band.

Some embodiments include a matching element coupled between the ground point and the primary radiator. The matching element may be operable to increase a length between the primary radiator and the ground point. Some embodiments provide that the matching element includes an inductor that includes and/or is series coupled with a capacitor.

In some embodiments, the first filter circuit includes a first capacitor that is coupled between the first point on the primary radiator and the first antenna port, a first inductor that includes a first terminal that is coupled to the first point on the primary radiator, and a second capacitor that includes a first terminal that is coupled to a second terminal of the first inductor and a second terminal that is coupled to the first antenna port. The second filter circuit may include a second inductor that is coupled between the second point on the primary radiator and the second antenna port, a third capacitor that includes a first terminal that is coupled to the second point on the primary radiator, and a third inductor that includes a first terminal that is coupled to a second terminal of the third capacitor and a second terminal that is coupled to the second antenna port.

Some embodiments provide that at least one of the first inductor, the second inductor and the third inductor is a multi-layer chip inductor. In some embodiments, at least one of the first inductor, the second inductor and the third inductor is a wirewound inductor.

Some embodiments include a first capacitor coupled between the ground point and the primary radiator. The first point on the primary radiator is between the second point on the primary radiator and the first capacitor and the first filter circuit includes a first inductor having a first inductance and the first antenna port includes a frequency modulated (FM) radio band port. The second filter circuit may include a second capacitor arranged in parallel with a second inductor than includes a second inductance that is less than the first inductance. The first capacitor and the second capacitor have a substantially similar capacitance value.

In some embodiments, the first antenna branch, a first portion of the primary radiator that is between the first point on the primary radiator and the second point on the primary radiator, and a second portion of the primary radiator that is beyond the second point on the primary radiator are collectively operative to resonate at a frequency in the first frequency band. The second antenna branch and the second portion of the primary radiator may be collectively operative to resonate at a frequency in the second frequency band.

Some embodiments provide that the primary radiator includes a length of about 30 mm and is arranged at a distance in a range of about 2 mm to about 4 mm from the ground plane. The first point on the primary radiator may be located at a position along the primary radiator to provide an impedance match. The second antenna branch may be located at a position along the primary radiator that is in a range of about ⅓ of a distance from the first point on the primary radiator to an end of the primary radiator to about ½ of the distance from the first point on the primary radiator to the end of the primary radiator.

Some embodiments include an RF transceiver including an RF transmitter coupled to the primary radiator and an RF receiver coupled to the primary radiator, a user interface including a speaker and a microphone, and a processor coupled between the user interface and the transceiver, wherein the processor is configured to receive radiotelephone communications through the receiver and to reproduce audio communications using the speaker responsive to the received radiotelephone communications and to generate radiotelephone communications for transmission through the transmitter responsive to audio input received through the microphone.

Embodiments may further include a printed circuit board (PCB) including electrically conductive traces provided at different planes thereof, wherein portions of the processor, user interface, and/or transceiver are implemented as electronic components provided on the printed circuit board, and wherein the ground plane is provided as an electrically conductive layer at one or more planes of the printed circuit board.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

DETAILED DESCRIPTION

Figure 1:
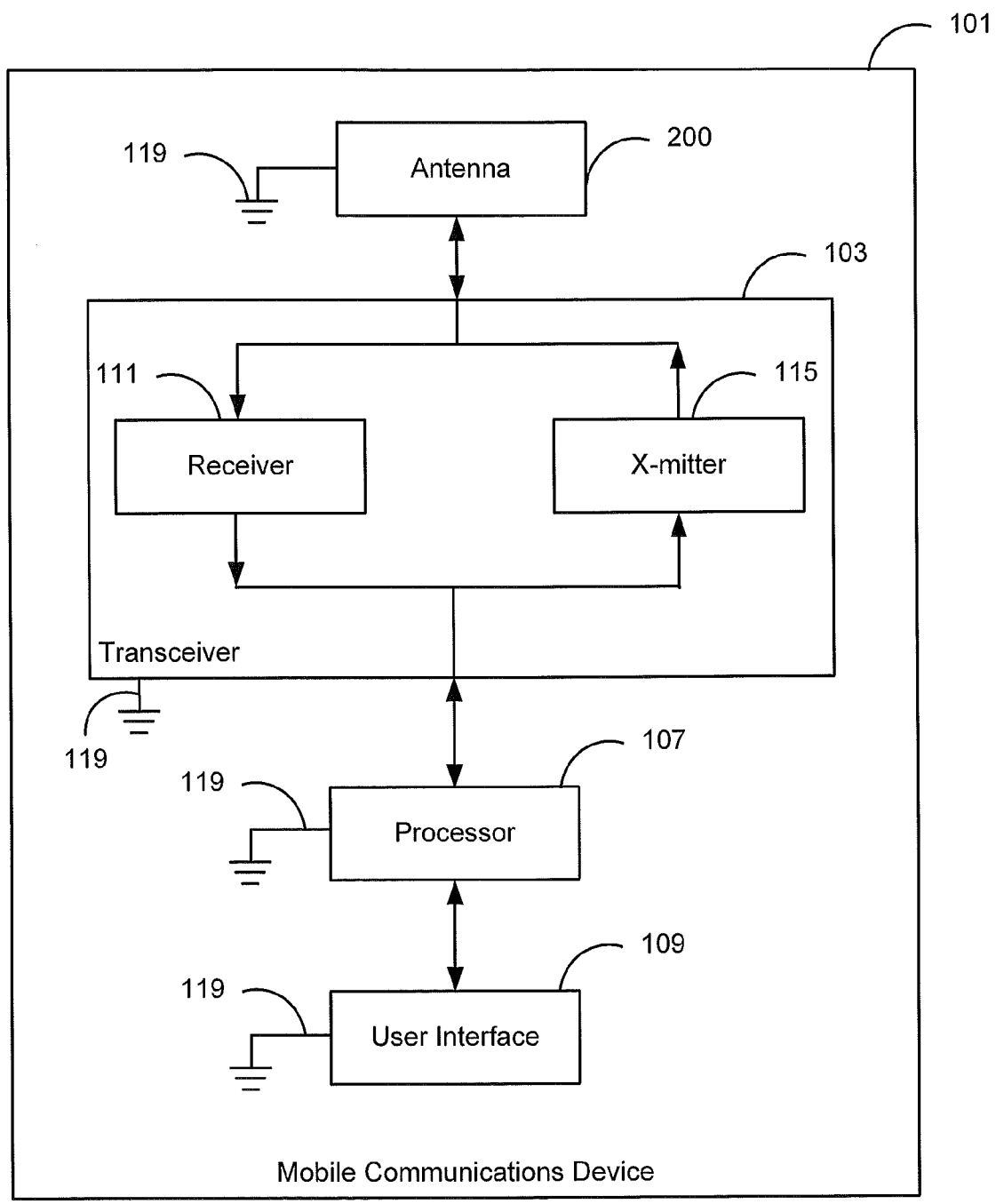
FIG. 1 is a block diagram illustrating communication structures according to some embodiments of the present invention.

Embodiments of the invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "coupled" or "connected" to another element, it can be directly coupled or connected to the other element or intervening elements may be present. In contrast, when an element is referred to as being "directly coupled" or "directly connected" to another element, there are no intervening elements present. Like numbers refer to like elements throughout.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

For purposes of illustration and explanation only, various embodiments of the present invention are described herein in the context of multiband wireless ("mobile") communication terminals ("wireless terminals" or "terminals") that are configured to carry out cellular communications (e.g., cellular voice and/or data communications) in more than one frequency band. It will be understood, however, that the present invention is not limited to such embodiments and may be embodied generally in any wireless communication terminal that includes a multiband RF antenna that is configured to transmit and receive in two or more frequency bands.

As used herein, the term "multiband" can include, for example, operations in any of the following bands: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, and/or Universal Mobile Telecommunications System (UMTS) frequency bands. GSM operation may include transmission in a frequency range of about 824 MHz to about 849 MHz and reception in a frequency range of about 869 MHz to about 894 MHz. EGSM operation may include transmission in a frequency range of about 880 MHz to about 914 MHz and reception in a frequency range of about 925 MHz to about 960 MHz. DCS operation may include transmission in a frequency range of about 1710 MHz to about 1785 MHz and reception in a frequency range of about 1805 MHz to about 1880 MHz. PDC operation may include transmission in a frequency range of about 893 MHz to about 953 MHz and reception in a frequency range of about 810 MHz to about 885 MHz. PCS operation may include transmission in a frequency range of about 1850 MHz to about 1910 MHz and reception in a frequency range of about 1930 MHz to about 1990 MHz. UMTS operation may include transmission/reception using Band 1 (between 1920 MHz and 1980 MHz and/or between 2110 MHz and 2170 MHz); Band 4 (between 1710 MHz and 1755 MHz and/or between 2110 MHz and 2155 MHz); Band 38 (china: between 2570 MHz and 2620 MHz); Band 40 (china: between 2300 MHz and 2400 MHz); and BT/WLAN (between 2400 MHz and 2485 MHz). Other bands can also be used in embodiments according to the invention. For example, antennas according to some embodiments of the present invention may be tuned to cover additional frequencies such as bands 12, 13, 14, and/or 17 (e.g., between about 698 MHz and 798 MHz). Antennas according to some embodiments of the present invention may be tuned to also cover 1575 MHz GSM, and in such embodiments, a diplexer may be used separate GSM signals (from other signals) for processing in a separate GSM receiver.

Some embodiments may arise from the present realization that a multiband antenna structure can be configured to use a dual feed excitation structure that excites a primary radiator line using RF signals having frequency bands that are isolated from one another using bandpass filters at respective ones of the ports. In this manner, the antenna structure may provide multiple radiators on the same structure that may require less space while substantially maintaining radiator efficiencies.

FIG. 1 is a block diagram of a wireless communications terminal 101 (such as a mobile radiotelephone) according to some embodiments of the present invention. Wireless communications terminal 101 may include RF (radio frequency) transceiver 103 coupled between antenna 200 and processor 107. In addition, user interface 109 may be coupled to processor 107, and user interface 109 may include a speaker, a microphone, a display (e.g., an LCD screen), a touch sensitive input (e.g., a touch sensitive display screen, a touch sensitive pad, etc.), a keypad, etc. As further shown in FIG. 1, transceiver 103 may include receiver 111 and transmitter 115, but some embodiments of the present invention may include only a receiver or only a transmitter. Accordingly, processor 107 may be configured to receive radiotelephone communications through receiver 111 and to reproduce audio communications using a speaker of user interface 109 responsive to the received radiotelephone communications, and/or to generate radiotelephone communications for transmission through transmitter 115 responsive to audio input received through the microphone of user interface 109.

Moreover, portions of antenna 200, processor 107, user interface 109, and/or transceiver 103 may be implemented as electronic components (e.g., integrated circuit and/or discrete electronic devices such as resistors, capacitors, inductors, transistors, diodes, etc.) provided on a printed circuit board (PCB) or boards. Moreover, the printed circuit board(s) may include electrically conductive traces at a plurality of different planes thereof providing electrical coupling between electronic components thereon, and an electrical ground plane may be provided as an electrically conductive layer at one or more planes of the printed circuit board. As shown in FIG. 1, each of antenna 200, transceiver 103, processor 107, and/or user interface 109 may be electrically coupled to a common ground plane as indicated by ground symbols 119.

As discussed in greater detail below, antenna 200 may include a plurality of branches to provide resonances at different frequency bands, such as at frequencies less than about 960 MHZ (e.g. in the range of about, 824 MHz to about 960 MHz), at frequencies in the range of about 1.7 GHz to about 2.0 GHz, at frequencies at frequencies in the range of about 2 GHz to about 2.3 GHz, and/or at frequencies greater than about 2.3 GHz (e.g., in the range of about 2.3 GHz to about 2.7 GHz). Moreover, some embodiments provide that the antenna 200 may include filter circuits corresponding to different ones of the plurality of branches. For example, bandpass circuits may serve to isolate various ones of the different frequency bands from one another while sharing portions of a primary radiator in the antenna. In this regard, the ones of the branches may be operable to provide resonance at different frequency bands using a common feed conductor and/or portions thereof, to radiate in the different frequency bands.

Figure 2:
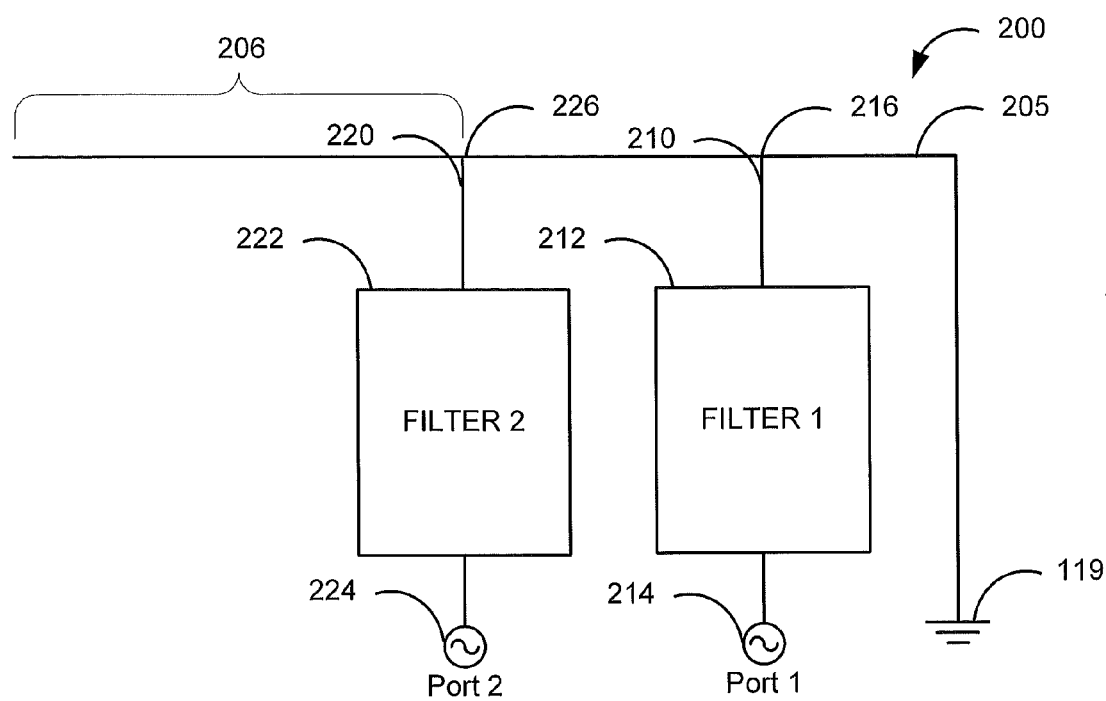
FIG. 2 is a schematic block diagram illustrating a circuit of a communication structure according to some embodiments of the present invention.

Reference is now made to FIG. 2, which is a schematic block diagram illustrating a circuit of a communication structure according to some embodiments of the present invention. The communication structure may include an antenna 200 that is coupled to a ground point 119, including, for example, one or more mobile terminal ground planes. The antenna 200 may include a primary radiator 205 that may be conductively coupled to the ground point 119 and may be spaced apart some distance from the ground plane.

A first antenna branch 210 that includes a first filter circuit (FILTER 1) 212, that is coupled between a first feed point 216 on the primary radiator 205 and a first antenna port (PORT 1) 214. The first antenna port 214 may provide an antenna feed that corresponds to a first frequency band in which the first antenna branch resonates with high efficiency. For example, some embodiments provide that the first frequency band corresponds to the frequencies of about 1.575 GHz, as transmitted by satellites in a Global Positioning System (GPS).

A second antenna branch 220 that includes a second filter circuit (FILTER 2) 222, that is coupled between a second feed point 226 on the primary radiator 205 and a second antenna port (PORT 2) 224. The second antenna port 224 may provide an antenna feed that corresponds to a second frequency band in which the second antenna branch 220 resonates with high efficiency. For example, some embodiments provide that the second frequency band corresponds to the frequencies of about 2.4 GHz, as used in, for example, Bluetooth, which is an open wireless technology standard for exchanging data over short distances. Additionally, a second frequency band of about 2.4 GHz may be used in a wireless local area network (WLAN) that operates according to the IEEE 811.2 g standard, among others.

In some embodiments, the first antenna branch 210 may be operable to use the first filter circuit 212 and the full length of the primary radiator 205 to provide resonance in the first frequency band. The second antenna branch 220 may be operable to use the second filter circuit 222 and only a latter portion 206 of the primary radiator 205 that extends beyond the second feed point 226. The first filter circuit 212 provides a low ohmic path to signals in the first frequency band and filters out signals in the second frequency band thus presenting an open circuit to the second frequency band signals. Similarly, the second filter circuit 212 provides a low ohmic path to signals in the second frequency band and filters out signals in the first frequency band thus presenting an open circuit to the first frequency band signals.

Figure 3:
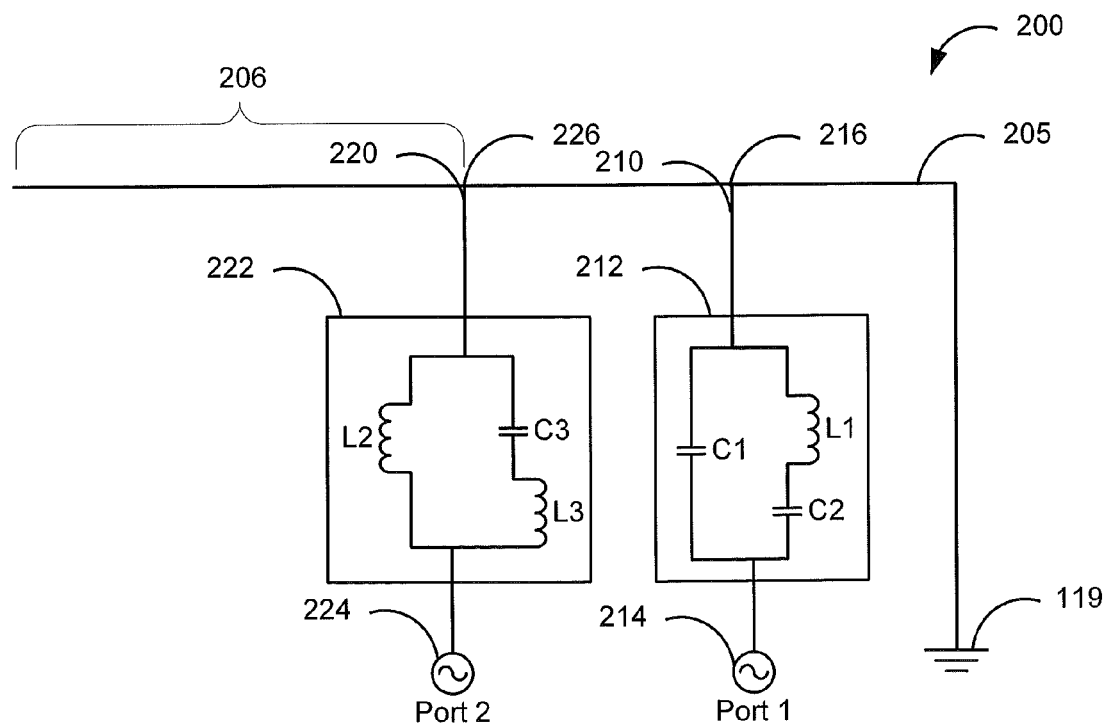
FIG. 3 is a schematic diagram illustrating a circuit of a communication structure according to some embodiments of the present invention.

Reference is now made to FIG. 3, which is a schematic diagram illustrating a circuit of a communication structure according to some embodiments of the present invention. As illustrated in FIG. 3, the first filter circuit 212 may include a first capacitor C1 in parallel with a series combination of a first inductor L1 and a second capacitor C2. In some embodiments, the order of the series connected components L1 and C2 may be specific to the frequency response of the first filter circuit 212. For example, some embodiments provide that the first inductor L1 is conductively coupled to the primary radiator 205 and the second capacitor C2 is conductively coupled to the first antenna port 214.

The second filter circuit 222 may include a second inductor L2 in parallel with a series combination of a third capacitor C3 and a third inductor L3. In some embodiments, the order of the series connected components C3 and L3 may be specific to the frequency response of the second filter circuit 222. For example, some embodiments provide that the third capacitor C3 is conductively coupled to the primary radiator 205 and the third inductor L3 is conductively coupled to the second antenna port 224. Although, exemplary filter circuits described herein provide three components, higher order matching circuits using five, seven, etc. components may be used within the spirit and scope of this disclosure.

Some embodiments provide that the inductors L1, L2 and L3 may be multilayer and/or wirewound inductors. Since wirewound inductors may have an increased Q-factor, which may be used as a measure of the quality in a tuned circuit, different inductor values may be used depending on whether multilayer or wirewound inductors are used in the same application. For example, a combination antenna according to some embodiments provided herein may include a first antenna branch 210 that is operable to resonate in frequencies corresponding to GPS functions and a second antenna branch 220 that is operable to resonate in frequencies corresponding to Bluetooth and/or WLAN communications. In this regard, the following table lists different component values that may be used in circuits including both multilayer components and wirewound components.

| Bluetooth/GPS Combination Antenna | | |
| --- | --- | --- |
| | Circuit with Wirewound Components | Circuit with Multi-Layer Components |
| C1 | 0.2 pF | 0.2 pF |
| C2 | 0.4 pF | 0.4 pF |

| Bluetooth/GPS Combination Antenna | | |
| --- | --- | --- |
| | Circuit with Wirewound Components | Circuit with Multi-Layer Components |
| C3 | 0.6 pF | 0.6 pF |
| L1 | 15 nH | 15 nH |
| L2 | 8.2 nH | 5.6 nH |
| L3 | 12 nH | 10 nH |

In addition to using different inductor values between wirewound and multilayer inductors, using wirewound inductors may provide better antenna performance as compared to multilayer inductors. For example, the table below lists the average gain in the GPS and Bluetooth frequency bands of a prototype antenna having about 4 mm spacing between the primary radiator 205 and a ground plane and using the above listed component values.

| Inductor Type | Average Gain (dB) | |
| --- | --- | --- |
| | GPS | Bluetooth |
| Multi-layer | −4.4 | −0.8 |
| Wirewound | −3.3 | −0.6 |

In design and implementation, tuning a combination antenna for a GPS/Bluetooth combination may begin with an antenna having a primary radiator 205 that is approximately 30 mm in length. A first antenna branch 210 that corresponds to the GPS frequency band may be adjusted first by adjusting the first feed point 216 to get a desirable impedance match. For example, in some embodiments, a 50 ohm impedance match may be used. In some embodiments, the total length of the primary radiator 205 may be adjusted to tune the GPS frequency.

Once the first antenna branch 210 is tuned, the second antenna branch 220 may be added to the primary radiator 205 to the second feed point 226 that may be located ⅓ to about ½ of the distance between the first feed point 216 and the end of the primary radiator 205. Some embodiments provide that the position of the second feed point 226 may be varied to tune the resonant frequency to the Bluetooth and/or WLAN frequency band. In some embodiments, if the impedance of the second antenna branch 220 is not close to, for example, 50 ohms, a shunt inductor may be added to the second antenna port 224.

Figure 4:
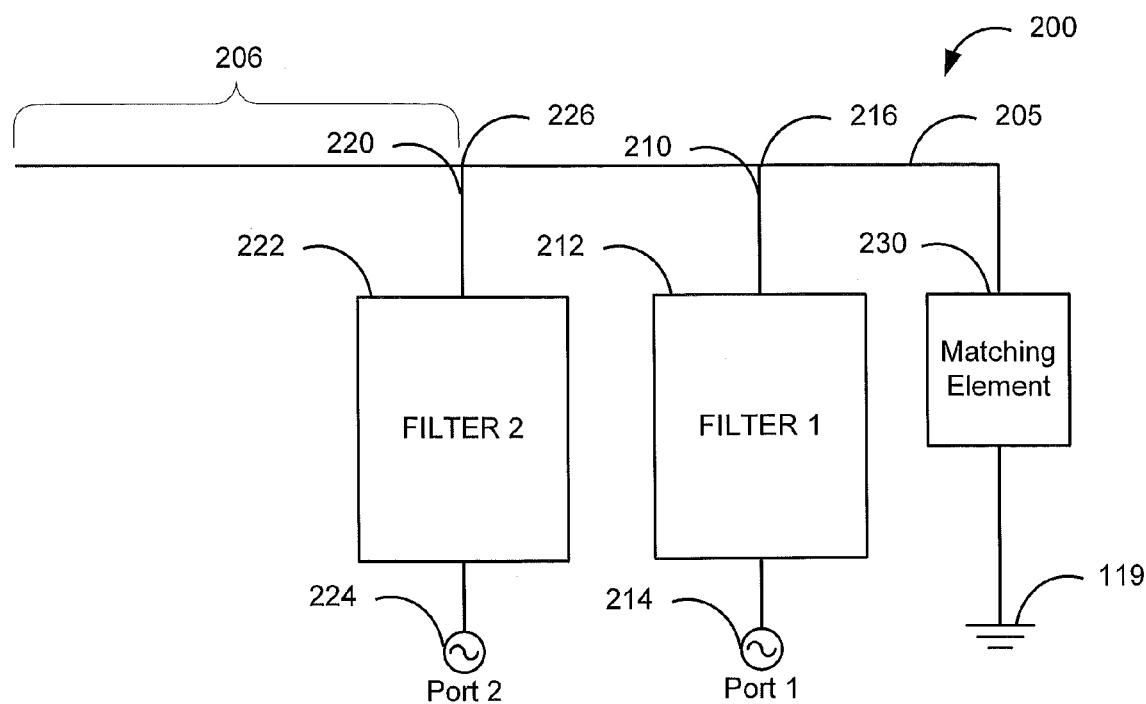
FIG. 4 is a schematic block diagram illustrating a circuit of a communication structure according to some embodiments of the present invention.

In some embodiments, such as where the spacing between the primary radiator 205 and a ground plane is reduced, one or more elements may be added to one or both of the first and second antenna ports 214, 224 to match the resonance on the respective first and second antenna branches 210, 220. Further, some embodiments include one or more matching elements between the primary radiator 205 and the ground point 119 feeder. For example, reference is now made to FIG. 4, which is a schematic block diagram illustrating a circuit of a communication structure according to some embodiments of the present invention. In addition to the structures discussed above regarding FIG. 2, FIG. 4 provides a matching element 230 that is coupled between the ground point 119 and the primary radiator 205.

Figure 5:
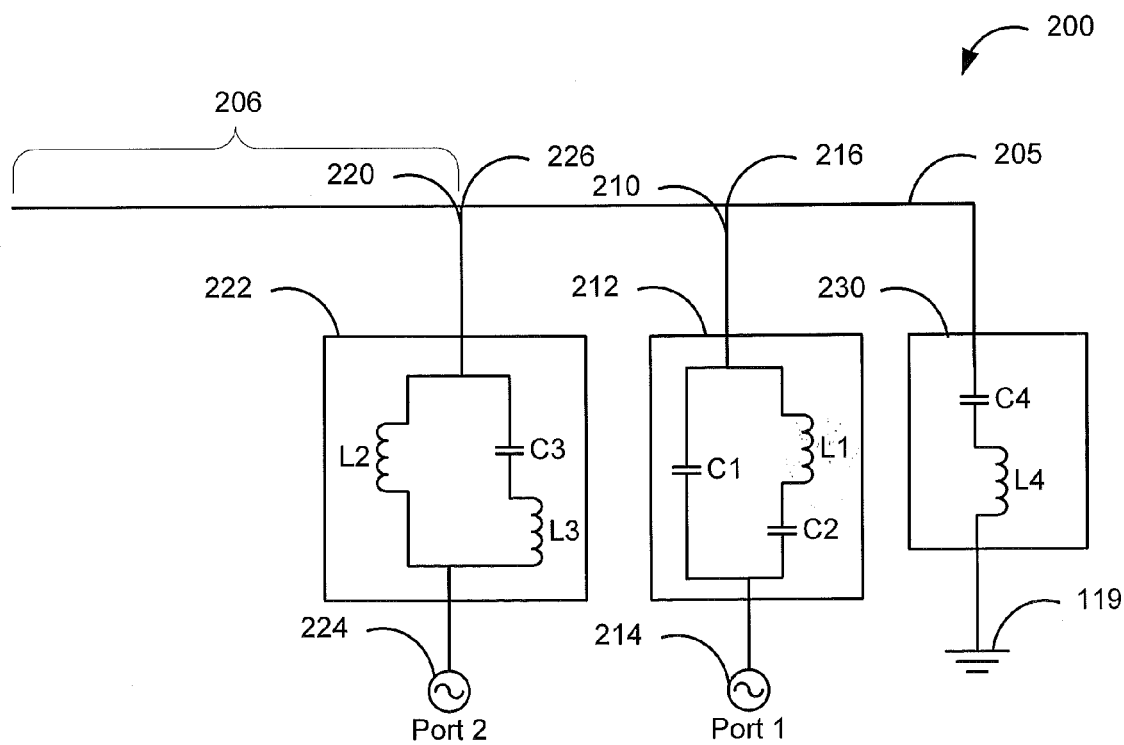
FIG. 5 is a schematic diagram illustrating a circuit of, a communication structure according to some embodiments of the present invention.

Although referred to in the singular, the matching element 230 may include one or more components and/or types of components. For example, reference is now made to FIG. 5, which is a schematic diagram illustrating a circuit of a communication structure according to some embodiments of the present invention. The matching element 230 may include a series combination of a fourth capacitor C4 and a fourth inductor L4. Continuing with a combined GPS and Bluetooth antenna example as discussed above regarding FIG. 3, but with a 3 mm spacing between the primary radiator 205 and ground plane, and including the component values corresponding to multi-layer inductors, exemplary values of different combinations of components in the matching element 230 that maintain GPS impedance are provided in the table below.

| L4 (nH) | C4 (pF) | $S_{21}$ (Forward Transmission Coefficient) | |
|---|---|---|---|
| | | GPS | Bluetooth |
| 3.9 | 2.2 | 0.68 | 1.5 |
| 5.6 | 1.5 | 0.74 | 2.15 |
| 8.2 | 1 | 0.85 | 5 |

As listed, the above combinations maintain GPS impedance, but add extra inductance to improve impedance matching in the Bluetooth frequency band. When using the first listed combination, the free-space average efficiency of a prototype was measured over a range of frequencies about the GPS frequency band and about the Bluetooth frequency band. The results are provided in the following table:

| | Frequency (GHz) | | | | | | |
|---|---|---|---|---|---|---|---|
| | 1.565 | 1.575 | 1.585 | 1.605 | 2.4 | 2.25 | 2.485 |
| Average Efficiency (dB) | −3.9 | −3.1 | −2.8 | −3.7 | −2.9 | −1.8 | −1.8 |

Figure 6:
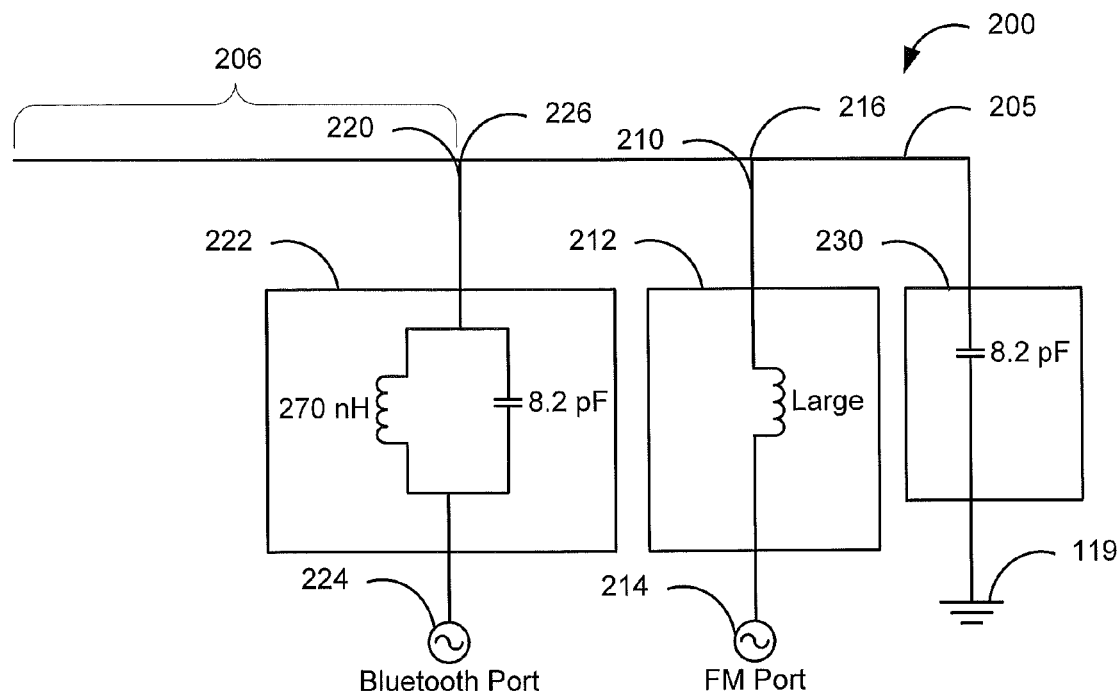
FIG. 6 is a schematic diagram illustrating a circuit of a communication structure according to some embodiments of the present invention.

Brief reference is now made to FIG. 6, which is a schematic diagram illustrating a circuit of a communication structure according to some embodiments of the present invention. Although embodiments discussed herein have included antenna combinations of GPS and Bluetooth frequency bands, the present invention is not so limited. For example, communication structures as disclosed herein may be used to provide an antenna that resonates in a variety of different frequency bands that may correspond to multiple different applications, functions, and/or types thereof. For example, the communication structure as illustrated in FIG. 6 may be used to provide an antenna that is operable to resonate in an FM radio band (e.g., 87.5-108.0 MHz) and a Bluetooth frequency band (2.4 GHz).

Figure 7:
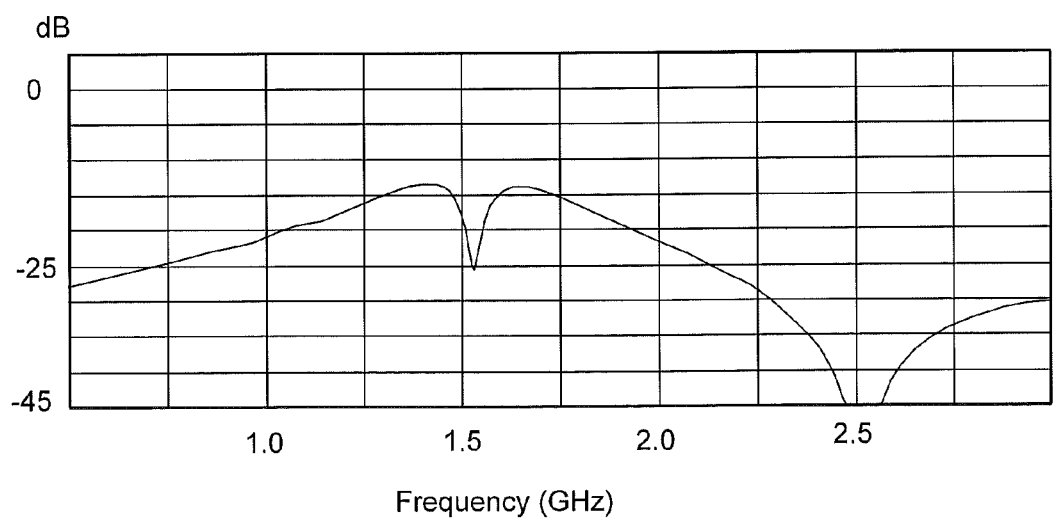
FIG. 7 is a graph illustrating performance characteristics of antennas according to some embodiments of the present invention.

Brief reference is now made to FIG. 7, which is a graph illustrating performance characteristics of antennas according to some embodiments of the present invention. As illustrated, the isolation between the two ports (GPS at 1.575 GHz and Bluetooth at 2.4 GHz) may be provided at a value of around 20 dB. In this regard, by using bandpass filters in multiple ones of the antenna branches, antenna efficiency and isolation may be provided in multiple frequency bands.

Some embodiments provide that the communication structures described herein may be used to provide an antenna having two ports with frequency bands that are closely spaced, overlapping and/or adjacent one another. For example, conventional antenna design may be challenged to provide resonance across a wide band of low frequencies. As disclosed herein, different ports may be operable to resonate in nearby bands within, for example, 700 MHz to 960 MHz.

In this manner, each of the different ports may be configured to operate in a portion of the total frequency band. A surface acoustic wave (SAW) filter may be provided that is operable to selectively activate the communication structure corresponding to one of the first frequency band and the second frequency band. In this manner, one port may become functionally invisible while the other port is active.

Many alterations and modifications may be made by those having ordinary skill in the art, given the benefit of present disclosure, without departing from the spirit and scope of the invention. For example, antennas according to embodiments of the invention may have various shapes, configurations, and/or sizes and are not limited to those illustrated. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates concepts of the invention.

That which is claimed is:

1. A communication structure, comprising:
   a mobile terminal ground plane including a ground point;
   a primary radiator that is electrically coupled to the ground point;
   a first antenna branch that includes a first filter circuit that is coupled between a first point on the primary radiator and a first antenna port and that corresponds to a first frequency band; and
   a second antenna branch that includes a second filter circuit that is coupled between a second point on the primary radiator and a second antenna port that corresponds to a second frequency band that is different from the first frequency band,
   wherein the primary radiator comprises a length of about 30 mm and is arranged at a distance in a range of about 2 mm to about 4 mm from the ground plane,
   wherein the first point on the primary radiator is located at a position along the primary radiator to provide an impedance match, and
   wherein the second antenna branch is located at a position along the primary radiator that is in a range of about ⅓ of a distance from the first point on the primary radiator to an end of the primary radiator to about ½ of the distance from the first point on the primary radiator to the end of the primary radiator.

2. A communication structure according to claim 1, wherein the first filter circuit comprises a first bandpass filter that is configured to provide a low ohmic path to signals corresponding to frequencies at least of about 1.575 GHz.

3. A communication structure according to claim 1, wherein the second filter circuit is operable to filter out a signal that includes frequencies in the first frequency band,
   wherein the first filter circuit is operable to filter out a signal that includes frequencies in the second frequency band, and
   wherein a difference between the first frequency band and the second frequency band provides frequency isolation between the first antenna port and the second antenna port.

4. A communication structure according to claim 1, wherein the first antenna branch is operable to resonate at the first frequency band, wherein the second antenna branch is operable to resonate at the second frequency band, and wherein the first frequency band is substantially adjacent the second frequency band to provide antenna performance over a combined bandwidth that substantially includes the first frequency band and the second frequency band.

5. A communication structure according to claim 4, wherein the combined bandwidth comprises a frequency band including a frequency range of about 700 Mhz to about 960 MHz.

6. A communication structure according to claim 5, further comprising a filter that is operable to selectively activate the communication structure corresponding to one of the first frequency band and the second frequency band.

7. A communication structure according to claim 1, further comprising a matching element coupled between the ground point and the primary radiator, wherein the matching element is operable to increase a length between the primary radiator and the ground point.

8. A communication structure according to claim 7, wherein the matching element comprises an inductor that includes and/or is series coupled with a capacitor.

9. A communication structure according to claim 1, further comprising a first capacitor coupled between the ground point and the primary radiator,
wherein the first point on the primary radiator is between the second point on the primary radiator and the first capacitor,
wherein the first filter circuit comprises a first inductor having a first inductance and the first antenna port comprises a frequency modulated (FM) radio band port,
wherein the second filter circuit comprises a second capacitor arranged in parallel with a second inductor than includes a second inductance that is less than the first inductance, and
wherein the first capacitor and the second capacitor have a substantially similar capacitance value.

10. A communication structure according to claim 1 further comprising:
an RF transceiver including an RF transmitter coupled to the primary radiator and an RF receiver coupled to the primary radiator;
a user interface including a speaker and a microphone; and
a processor coupled between the user interface and the transceiver, wherein the processor is configured to receive radiotelephone communications through the receiver and to reproduce audio communications using the speaker responsive to the received radiotelephone communications and to generate radiotelephone communications for transmission through the transmitter responsive to audio input received through the microphone.

11. A communication structure according to claim 10 further comprising:
a printed circuit board (PCB) including electrically conductive traces provided at different planes thereof, wherein portions of the processor, user interface, and/or transceiver are implemented as electronic components provided on the printed circuit board, and wherein the ground plane is provided as an electrically conductive layer at one or more planes of the printed circuit board.

12. A communication structure, comprising:
a mobile terminal ground plane including a ground point;
primary radiator that is electrically coupled to the ground point;
a first antenna branch that includes a first filter circuit that is coupled between a first point on the primary radiator and a first antenna port and that corresponds to a first frequency band; and
a second antenna branch that includes a second filter circuit that is coupled between a second point on the primary radiator and a second antenna port that corresponds to a second frequency band that is different from the first frequency band, wherein the first filter circuit comprises:
a first capacitor that is coupled between the first point on the primary radiator and the first antenna port;
a first inductor that includes a first terminal that is coupled to the first point on the primary radiator; and
a second capacitor that includes a first terminal that is coupled to a second terminal of the first inductor and a second terminal that is coupled to the first antenna port, and
wherein the second filter circuit comprises:
a second inductor that is coupled between the second point on the primary radiator and the second antenna port;
a third capacitor that includes a first terminal that is coupled to the second point on the primary radiator; and
a third inductor that includes a first terminal that is coupled to a second terminal of the third capacitor and a second terminal that is coupled to the second antenna port.

13. A communication structure according to claim 12, wherein at least one of the first inductor, the second inductor and/or the third inductor comprises a multi-layer chip inductor.

14. A communication structure according to claim 12, wherein at least one of the first inductor, the second inductor and the third inductor comprises a wirewound inductor.

15. A communication structure, comprising:
a mobile terminal ground plane including a ground point;
a primary radiator that is electrically coupled to the ground point;
a first antenna branch that includes a first filter circuit that is coupled between a first point on the primary radiator and a first antenna port and that corresponds to a first frequency band; and
a second antenna branch that includes a second filter circuit that is coupled between a second point on the primary radiator and a second antenna port that corresponds to a second frequency band that is different from the first frequency band,
wherein the first antenna branch, a first portion of the primary radiator that is between the first point on the primary radiator and the second point on the primary radiator, and a second portion of the primary radiator that is beyond the second point on the primary radiator are collectively operative to resonate at a frequency in the first frequency band, and
wherein the second antenna branch and the second portion of the primary radiator are collectively operative to resonate at a frequency in the second frequency band.

16. A communication structure according to claim 15, wherein the first point on the primary radiator is arranged between the second point on the primary radiator and the ground point, and
wherein the first antenna port comprises a global positioning system (GPS) port.

17. A communication structure according to claim 16, wherein the second antenna port comprises a BlueTooth and/or wireless local area network (WLAN) port.

18. A communication structure according to claim 16, wherein the second filter circuit comprises a second bandpass filter that is configured to provide a low ohmic path to signals corresponding to frequencies at least of about 2.4 GHz.

* * * * *